April 1, 1958     K. ROTHSTEIN     2,828,541

SHEARS

Filed July 30, 1954

Inventor:
Karl Rothstein

United States Patent Office 2,828,541
Patented Apr. 1, 1958

2,828,541

SHEARS

Karl Rothstein, Solingen, Germany, assignor to Firma J. A. Henckels Zwillingswerk A. G., Solingen, Germany Application July 30, 1954, Serial No. 446,869

Claims priority, application Germany July 31, 1953

7 Claims. (Cl. 30—266)

The present invention relates to shears and more particularly to hand operated shears of the type used in the household, on textiles, on poultry, and the like.

Conventional shears of the above type include a pair of cutting blades operable with respect to each other about a predetermined pivot axis and having their inner side faces in engagement with each other. Such blades are conventionally connected together at the pivot axis through such devices as a screw, a bolt and nut, a rivet, and the like. For many purposes it is desirable to separate the blades from each other, but with such connections between the blades it is not possible for the average layman to separate the blades and properly interconnect the same with each other. For example, for cleaning or sharpening purposes, the layman would wish to separate the blades from each other, but up to the present time the connection between the blades does not permit easy separation and interconnecting of the blades.

One of the objects of the present invention is to overcome the above drawbacks by providing a shears with a means for quickly and easily connecting and disconnecting the shear blades from each other, this connection and disconnection being such that it may be easily performed by the layman without the use of any tools whatsoever.

Another object of the present invention is to provide a shears capable of accomplishing the above object and at the same time having a smooth outer surface at both blades when the latter are operatively connected to each other.

Furthermore, it is an object of the present invention to provide an extremely strong pivotal connection between the blades of a shears capable of accomplishing the above objects so that these shears may be used for all purposes.

An additional object of the present invention is to provide a shears capable of accomplishing the above objects and at the same time having the blades thereof securely joined to each other for normal operations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
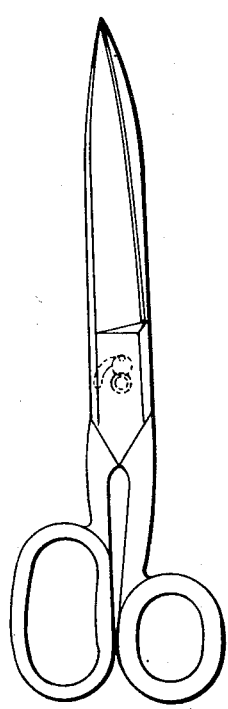
Fig. 1 is an elevational view of a shears constructed in accordance with the present invention.
Figure 2:
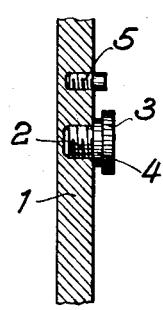
Fig. 2 is a fragmentary, sectional view taken along the line II—II of Fig. 4.
Figure 3:
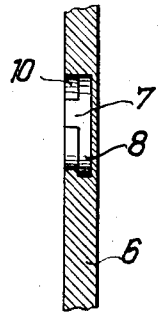
Fig. 3 is a fragmentary, sectional view taken along the line III—III of Fig. 5 and looking from the right, as viewed in Fig. 5.

Referring now to the drawings, it will be seen that the shears of the invention includes a blade 1 having a pivot pin 2 fixed to the inner side face thereof at the pivot axis of the shears. This pivot pin 2 is stepped and has an enlarged cylindrical head 3 spaced from the inner side face of the blade 1, an intermediate portion 4 smaller than the head 3 and larger than the shank of pin 2 being located between head 3 and the inner side face of the blade 1. A guide pin 5 is also fixed to the inner side face of blade 1, and this guide pin 5 is located from the center of head 3 by a distance somewhat greater than the diameter of the head 3. The guide pin 5 may, for example, be threaded into a threaded opening in the blade 1.

The other shear blade 6 is formed at its inner side face with a recess 7 having an entrance end 9 large enough to receive the head 3 of pivot pin 2 and having an undercut portion 8 located at the pivot axis of the shears and also being large enough to accommodate the head 3 of the pivot pin 2. The recess 7 is formed so that when the inner side faces of the blades 1 and 6 are placed next to each other the head 3 may be inserted into the end 9 of recess 7 and moved along the latter to the end 8 of recess 7 where the portion of blade 6 overlying the floor of recess 7 is located between head 3 and the inner side face of blade 1 for pivotally interconnecting the shear blades. A second recess 10 feeds into the non-undercut portion 9 of recess 7, this recess 10 being arcuate and located along a circle whose center is in the pivot axis of the shears, that is, at the center of undercut part 8 of recess 7. This recess 10 is wide enough to accommodate the pin 5.

Figures 4, 5:
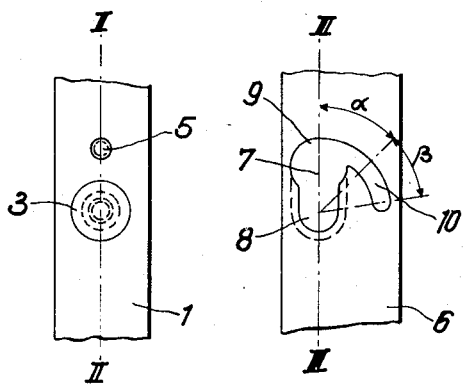
Fig. 4 shows the structure of Fig. 2 as seen from the right side thereof.
Fig. 5 shows the structure of Fig. 3 as seen from the left side thereof, Figs. 2–5 illustrating the details of the structure which interconnects the blades of the shears of Fig. 1.

When the blades 1 and 6 are located with their inner side faces next to each other and are angularly displaced with respect to each other through an angle of $\alpha$ plus $\beta$ (Fig. 5), then the head 3 of the pivot pin 2 is located in the part 9 of recess 7 and the pin 5 is located in the lower right end of recess 10. The recess 7 accommodates the head 3 and part 4 of pivot pin 2 with sufficient clearance to permit the head 3 and portion 4 of pivot pin 2 to move along the recess 7 to the end 8 thereof while the pin 5 remains at the lower right end of recess 10, as viewed in Fig. 5. Thus, the head 3 becomes located in the undercut portion of recess 7 to interconnect the blades with each other. Then the blades are turned with respect to each other about the pivot axis of the shears, that is, about the axis of the pivot pin 2, so that the pin 5 moves along the recess 10 into the portion 9 of recess 7. In this manner, the connection of the blades is accomplished. During cutting the blades are turned with respect to each other substantially through the angle $\alpha$ of Fig. 5, and the pin 5 moves back and forth partly along the recess 10 and in and out of the recess 9, the pin 5 engaging the top continuous edge of recesses 9 and 10 to hold the pivot pin 2 at the end 8 of recess 7. The shears operate faultlessly in this manner and the pin 5 guarantees that the pivot axis of the shears will remain unchanged. When it is desired to separate the blades from each other it is only necessary to displace them with respect to each other through the above-mentioned angle $\alpha$ plus $\beta$ and the pivot pin 2 may then be moved back to the end 9 of recess 7 to permit the blades to be separated.

It should be noted that the invention is not necessarily limited to the above-described construction. For example, the pin 5 may be located on the blade 6 and the recess 10 on the blade 1.

Figure 6:
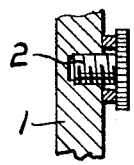
Figs. 6 and 7 are fragmentary, sectional views similar to Fig. 2 and showing modifications of the construction.
Figure 7:
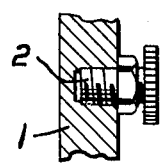

It is preferred to make the distance between the head 3 and the inner side face of the blade 1 adjustable, and for this purpose the guide pin 2 is threadedly connected to the blade 1. The portion 4 of the pivot pin 2, instead of being integral with the guide pin 2, may take the form of a simple washer serving as a spacer to determine the distance of head 3 from the inner side face of blade 1, as shown in Fig. 6, or this part 4 may be in the form of a lock nut threadedly engaging the pivot pin 2 and the inner side face of the blade 1 for adjusting the distance between the head 3 and this inner side face of the blade 1 as shown in Fig. 7.

The above-described shears may have the blades thereof separated from and reassembled with each other without any difficulty whatsoever, and it will be noted that when assembled, as shown in Fig. 1, the outer surfaces of the blades are entirely smooth. The pin 5 cooperates with the recess 10 and end 9 of recess 7 to guide the blades for turning movement with substantially no play.

It will be understood that each of the elements described above, or two or more together, may also find a useful application in other types of shears differing from the types described above.

While the invention has been illustrated and described as embodied in shears having disconnectable shear blades, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A shears having a predetermined pivot axis and comprising, in combination, a first shear blade having inner and outer side faces; a pivot pin fixed to said first shear blade at the inner face thereof and at the pivot axis of the shears and having an enlarged head having an arcuate rim portion and spaced from said inner face of said first blade; a second shear blade having inner and outer side faces and being formed with a first elongated cutout having an entrance end to receive said pivot pin when said inner blade faces are placed next to each other for operatively joining the blades together and having an opposite end distant from said entrance end and located at the pivot axis of the shears, said second blade having a portion at said opposite end of said cutout located between said first blade and said head of said pivot pin when said blades are operatively connected to each other, said pivot pin being movable along said first cutout from said entrance end thereof to said opposite end thereof for operatively joining said blades; and a guide pin fixed to and extending from the inner face of one of said blades, the other of said blades being formed with an arcuate cutout located along a circle whose center is in said pivot axis and having a portion in which said guide pin is located when said pivot pin is at said entrance end of said first cutout and about which said first blade turns during movement of said pivot pin to said opposite end of said first cutout.

2. A shears having a predetermined pivot axis and comprising, in combination, a first shear blade having inner and outer side faces and being formed with an arcuate cutout located along a circle whose center is in the pivot axis of the shears; a second shear blade having inner and outer side faces; a guide pin fixed to the inner face of said second shear blade, located at the same radial distance from said pivot axis as said arcuate cutout, and extending into the latter for movement therealong during turning of said blades with respect to each other about said pivot axis; and a pivot pin fixed to the inner face of one of said blades and having an enlarged head spaced from the inner face of said one blade, the other of said blades being formed with an elongated cutout having an entrance end to receive said pivot pin when the blades are to be operatively joined to each other and having an opposite end distant from said entrance end and located at said pivot axis, said other blade having a portion located between said head of said pivot pin and said one blade when said pivot pin is at said opposite end of said elongated cutout, said guide pin being located in a predetermined part of said arcuate cutout when said pivot pin is in said entrance end of said elongated cutout and said entrance end and opposite end of said latter cutout being located at equal distances from said part of said arcuate cutout, said elongated cutout extending along the path through which said pivot pin moves upon turning of said one blade about said predetermined part of said arcuate cutout.

3. A shears having a predetermined pivot axis and comprising, in combination, a first shear blade having inner and outer side faces; a pivot pin fixed to said first shear blade at the inner face thereof and at the pivot axis of the shears, said pivot pin having an enlarged head having an arcuate rim portion and spaced from said inner face of said first shear blade; a second shear blade having inner and outer side faces and being formed at its inner face with an elongated recess, said recess having a first end portion of a width substantially equal to the width of said head of said pivot pin and having a second end portion narrower than said first end portion and located at the pivot pin axis of the shears, said second end portion being undercut substantially to the width of said pivot pin head to receive said pivot pin head so that the latter may be moved along said recess to said undercut portion thereof for pivotally interconnecting said blades and away from said undercut portion to said first end portion of said recess for separating said blades; and a guide pin fixed to the inner face of one of said blades and spaced from the pivot axis of the shears, the other of said blades being formed in its inner face with an arcuate recess located along a circle whose center is in the pivot axis of the shears and having a first portion extending from said first end portion of said elongated recess and a second portion, said guide pin extending into said arcuate recess and maintaining said pivot pin in said second end portion at the pivot axis when said guide pin is in said first portion and said second portion being long enough to accommodate said guide pin when said head of said pivot pin is located at said first end portion of said elongated recess.

4. A shears having a predetermined pivot axis and comprising, in combination, a first shear blade having inner and outer side faces; a pivot pin fixed to said first shear blade at the inner face thereof and at the pivot axis of the shears, said pivot pin having an enlarged head having an arcuate rim portion and spaced from said inner face of said first shear blade; a second shear blade having inner and outer side faces and being formed at its inner face with an elongated recess, said recess having a first end portion of a width substantially equal to the width of said head of said pivot pin and having a second end portion narrower than said first end portion and located at the pivot pin axis of the shears, said second end portion being undercut substantially to the width of said pivot pin head to receive said pivot pin head so that the latter may be moved along said recess to said undercut portion thereof for pivotally interconnecting said blades and away from said undercut portion to said first end portion of said recess for separating said blades, and said second blade being formed with an arcuate recess extending from said first end portion of said elongated recess and located along an arc of a circle whose center is in said pivot axis; and a guide pin fixed to the inner face of said first blade and located in said arcuate recess.

5. A shears having a predetermined pivot axis and comprising, in combination, a first shear blade having inner and outer side faces; a pivot pin threadedly connected to said first shear blade at the inner face thereof and at the pivot axis of the shears, said pivot pin having an enlarged head having an arcuate rim portion and spaced from said inner face of said first shear blade; a second shear blade having inner and outer side faces and being formed at its inner face with an elongated recess, said recess having a first end portion of a width substantially equal to the width of said head of said pivot pin and having a second end portion narrower than said first end portion and located at the pivot pin axis of the shears, said second end portion being undercut substantially to the width of said pivot pin head to receive said pivot pin head so that the latter may be moved along said recess to said undercut portion thereof for pivotally interconnecting said blades and away from said undercut portion to said first end portion of said recess for separating said blades; and a guide pin fixed to the inner face of one of said blades and spaced from the pivot axis of the shears, the other of said blades being formed in its inner face with an arcuate recess located along a circle whose center is in the pivot axis of the shears and having a first portion extending from said first end portion of said elongated recess and a second portion, said guide pin extending into said arcuate recess and maintaining said pivot pin in said second end portion at the pivot axis when said guide pin is in said first portion and said second portion being long enough to accommodate said guide pin when said head of said pivot pin is located at said first end portion of said elongated recess.

6. A shears having a predetermined pivot axis and comprising, in combination, a first shear blade having inner and outer side faces; a pivot pin threadedly connected to said first shear blade at the inner face thereof and at the pivot axis of the shears, said pivot pin having an enlarged head having an arcuate rim portion and spaced from said inner face of said first shear blade; a second shear blade having inner and outer side faces and being formed at its inner face with an elongated recess, said recess having a first end portion of a width substantially equal to the width of said head of said pivot pin and having a second end portion narrower than said first end portion and located at the pivot pin axis of the shears, said second end portion being undercut substantially to the width of said pivot pin head to receive said pivot pin head so that the latter may be moved along said recess to said undercut portion thereof for pivotally interconnecting said blades and away from said undercut portion to said first end portion of said recess for separating said blades; a guide pin fixed to the inner face of one of said blades and spaced from the pivot axis of the shears, the other of said blades being formed in its inner face with an arcuate recess located along a circle whose center is in the pivot axis of the shears and having a first portion extending from said first end portion of said elongated recess and a second portion, said guide pin extending into said arcuate recess and maintaining said pivot pin in said second end portion at the pivot axis when said guide pin is in said first portion and said second portion being long enough to accommodate said guide pin when said head of said pivot pin is located at said first end portion of said elongated recess; and an annular member located about said pivot pin between said inner face of said first blade and the head of said pivot pin for determining the distance between said head and said inner face of said first blade.

7. A shears having a predetermined pivot axis and comprising, in combination, a first shear blade having inner and outer side faces; a pivot pin threadedly connected to said first shear blade at the inner face thereof and at the pivot axis of the shears, said pivot pin having an enlarged head having an arcuate rim portion and spaced from said inner face of said first shear blade; a second shear blade having inner and outer side faces and being formed at its inner face with an elongated recess, said recess having a first end portion of a width substantially equal to the width of said head of said pivot pin and having a second end portion narrower than said first end portion and located at the pivot pin axis of the shears, said second end portion being undercut substantially to the width of said pivot pin head to receive said pivot pin head so that the latter may be moved along said recess to said undercut portion thereof for pivotally interconnecting said blades and away from said undercut portion to said first end portion of said recess for separating said blades; a guide pin fixed to the inner face of one of said blades and spaced from the pivot axis of the shears, the other of said blades being formed in its inner face with an arcuate recess located along a circle whose center is in the pivot axis of the shears and having a first portion extending from said first end portion of said elongated recess and a second portion, said guide pin extending into said arcuate recess and maintaining said pivot pin in said second end portion at the pivot axis when said guide pin is in said first portion and said second portion being long enough to accommodate said guide pin when said head of said pivot pin is located at said first end portion of said elongated recess; and a lock nut threadedly engaging said pivot pin and located between the head thereof and said inner face of said first blade to engage said inner face for adjusting the distance between said head of said pivot pin and said inner face of said first blade.

References Cited in the file of this patent

UNITED STATES PATENTS

| 356,253 | Lant | Jan. 18, 1887 |
| 556,440 | Scheerer | Mar. 17, 1896 |
| 590,528 | Koch | Sept. 21, 1897 |
| 682,261 | Loichot | Sept. 10, 1901 |

FOREIGN PATENTS

| 94,806 | Germany | Nov. 9, 1897 |